United States Patent [19]

Brüne-Fischer et al.

[11] Patent Number: 5,480,916
[45] Date of Patent: Jan. 2, 1996

[54] METHOD FOR PRODUCING COLD POLYURETHANE FOAMS

[75] Inventors: Anette Brüne-Fischer; Georg Burkhart; Bernd-Jürgen Klietsch, all of Essen; Volker Zellmer, Bottrop, all of Germany

[73] Assignee: Th. Goldschmidt AG, Essen, Germany

[21] Appl. No.: 433,280

[22] Filed: Apr. 28, 1995

[30] Foreign Application Priority Data

Apr. 28, 1994 [DE] Germany ............................ 44 14 803.8

[51] Int. Cl.⁶ .................................................. C08G 18/28
[52] U.S. Cl. ................................................ 521/112; 528/28
[58] Field of Search ................................. 521/112; 528/28

[56] References Cited

U.S. PATENT DOCUMENTS

| | | |
|---|---|---|
| 3,741,917 | 6/1926 | Morehouse . |
| 3,952,038 | 4/1920 | Prokai . |
| 4,031,044 | 6/1921 | Joslyn . |
| 4,039,490 | 8/1977 | Kanner . |
| 4,067,828 | 1/1978 | Kanner et al. . |
| 4,110,272 | 8/1979 | Kanner et al. . |

FOREIGN PATENT DOCUMENTS

| | | |
|---|---|---|
| 0037067 | 10/1981 | European Pat. Off. . |
| 0106101 | 4/1984 | European Pat. Off. . |
| 0243131 | 10/1987 | European Pat. Off. . |
| 2221811 | 11/1973 | Germany . |
| 2356443 | 5/1974 | Germany . |
| 2402690 | 9/1974 | Germany . |
| 2507161 | 10/1975 | Germany . |
| 2533074 | 3/1976 | Germany . |
| 2603498 | 8/1976 | Germany . |
| 2736138 | 3/1979 | Germany . |
| 3626297 | 8/1986 | Germany . |

*Primary Examiner*—Morton Foelak
*Attorney, Agent, or Firm*—Anderson Kill Olick & Oshinsky

[57] ABSTRACT

High resilience polyurethane foams are produced by reacting a mixture of highly reactive polyols having a weight average molecular weight between about 4800 and 6500 g/mole and containing at least 70% primary hydroxyl groups and optionally fillers, polyfunctional isocyanates, amine activators, cross-linking agents, tin catalysts, blowing agents and stabilizers. The inventive stabilizers can be used universally in high resilience slabstock foam systems as well as in high resilience molded foam systems and in formulations based on pure TDI, TDI/MDI mixtures as well as on pure MDI in combination with appropriate polyols.

3 Claims, No Drawings

METHOD FOR PRODUCING COLD POLYURETHANE FOAMS

FIELD OF THE INVENTION

The present invention relates to a method of producing high resilience polyurethane foams.

BACKGROUND INFORMATION AND PRIOR ART

The large-scale industrial production of flexible polyurethane foams using isocyanates, polyether polyols, optionally cross linkers and other suitable additives has long been known and is described, for example, in Becker/Braun, Kunstoff-Handbuch (Plastics Handbook), Volume 7, Polyurethanes, published by Carl Hanser, Munich, Vienna, 2nd edition 1983.

Depending on the reactivity of the raw materials, a differentiation is made between hot cured flexible foams (hereinafter referred to as conventional flexible foams) and cold cured flexible foams (hereinafter referred to as high resilience (HR) foams), the concepts being derived from foaming in molds. When conventional flexible foams are produced by the mold method, the foam, because of the low reactivity of the raw materials, must be heated in the mold at an elevated temperature in order to complete the cross linking; these foams therefore are referred to as hot cured foams.

The development of highly reactive polyether polyols and optionally the additional use of cross-linking agents, on the other hand, enable foams to be produced in the mold which, because of the rapid curing, require little input of heat. Such foams therefore are named cold cured foams.

Aside from producing the foam in a mold, it is also possible to carry out the foaming by the slabstock method, for which the concepts of conventional flexible foam and high resilience foam have also become established.

Due to different starting raw materials, high resilience foams have typical physical properties different from those of conventional flexible foams.

The high resilience foams have:

(a) a latex-like feel, (b) a higher elasticity than conventional flexible foams; therefore, these foams are referred to as "highly resilient foams", (c) compression hardness characteristics differing from those of conventional flexible foam (a higher SAG factor) and thus offering a better sitting comfort when used as an upholstery material (furniture foam), (d) better continuous use properties with only a slight fatigue tendency, which is of great interest particularly in the automobile sector, (e) because of its melting behavior, a lower flammability than the conventional flexible foams, (f) a more advantageous energy balance and shorter molding times during mold (foaming) production in the molding operation.

In particular, a flexible polyurethane foam is produced by reacting a mixture of polyol, polyfunctional isocyanate, amine activator, tin catalyst, stabilizer, blowing agent (either water for forming carbon dioxide and/or the addition of physical blowing agents), optionally with the addition of flame retardants, cross-linking agents or other customary processing aids.

In contrast to conventional flexible foams, high resilience foams are produced from highly reactive polyols and, in addition, low molecular weight cross-linking agents. Higher functional isocyanates (so-called "crude MDI") may act as a cross-linking agent. Accordingly, there is already a reaction between isocyanate groups and hydroxyl groups during the expansion phase (formation of carbon dioxide from —NCO and $H_2O$) of the foam. This rapid polyurethane reaction initially leads to an increase in viscosity and then to a relatively high inherent stability of the foam during the blowing process.

For high resilience foam therefore, stabilizers are required, which control the cell size and the cell size distribution, and stabilize the subsurface area as well. Furthermore, compared to conventional flexible foams, high resilience foams have a higher proportion of closed cells, which must be opened mechanically (crushed) after removal of the foam from the mold. In addition, the high resilience foam has an irregular cell structure and, as a rule, coarser cells than conventional flexible foam, which contributes significantly to its properties named above.

As polyols, highly reactive polyols are used. These are trifunctional polyols, which have a high weight molecular weight of usually between about 4,800 and 6,500 g/mole and contains at least 70% (up to 95%) primary hydroxyl groups, so that their OH number is between 36 and 26. To the extent of up to 90%, these polyols are built up from propylene oxide. However, they contain primary hydroxyl end groups, which have resulted almost exclusively from the addition reaction of ethylene oxide. The primary hydroxyl groups are far more reactive towards isocyanate groups than are the secondary hydroxyl groups of the polyols used for conventional flexible foams. Their OH numbers usually are between 56 and 42 for weight molecular weights of 3,000 to 4,500.

The highly reactive polyols are obtained by the polyaddition reaction between propylene oxide or ethylene oxide and compounds of higher functionality, such as glycerin or trimethylolpropane, in the presence of basic compounds.

The so-called filled polyols represent a further class of highly reactive polyols. Aside from the characteristic data listed above, the latter are distinguished by the fact that they contain up to 40% or more of solid organic fillers in a dispersed distribution. It is customary to differentiate between:

A. polymer polyols: these are highly reactive polyols containing a dispersion of a copolymer based on styrene and acrylonitrile;

B. PHD polyols: these are highly reactive polyols containing polyurea, also in dispersed form; and C. PIPA polyols: these are highly reactive polyols containing a polyurethane (formed by an in situ reaction between an isocyanate and an alkanolamine in a conventional polyol) in a dispersed form.

The proportion of solids, which preferably lies between 5 and 40% depending on the application, is responsible for improved cell opening, so that the polyol can be reacted in a controlled manner particularly with the TDI to avoid shrinkage of the foams. The solid acts as an essential processing aid. A further function is to control the hardness by the solids content, since higher solid contents increase the hardness of the foam.

The formulations with solids-containing polyols have a clearly lower inherent stability and therefore require, aside from the chemical stabilization by the cross-linking reaction, a physical stabilization.

Depending on their solids content, the polyols are used alone or in admixture with the unfilled polyols named above.

As isocyanates, TDI (a 2,4- and 2,6-toluylene diisocyanate mixture of isomers), as well as MDI (4,4'-diphenylmethane diisocyanate) are used. Aside from the 4,4'-isomer, the so-called "crude MDI" or "polymeric MDI" also contains 2,4'- and 2,2' isomers, as well as polynuclear products. Binuclear products, consisting predominantly of mixtures of 2,4'-and 4,4'- isomers of their propolymers, are referred to as "pure MDI".

Different isocyanates are frequently used for slabstock foams and molded foams. For example, pure TDI (various mixtures of 2,4- and 2,6 isomers), in combination with solids-containing polyols, are usually used as polyfunctional isocyanate in high resilience slabstock foam systems. Moreover, modified TDI types are used in combination with highly reactive unfilled polyols. The German patents 25 07 161 and 26 03 498 also disclose the use of crystalline polyhydroxy compounds as cross-linking agents for slabstock foaming, in combination with highly reactive unfilled polyols, as well as TDI, trimerized TDI or also TDI/MDI mixtures. On the other hand, pure MDI formulations are normally not used for producing high resilience slabstock foams.

The formulations based on pure TDI, initially developed for foaming in molds, had the disadvantage of a narrow processing latitude. However, formulations based on TDI 80 admixtures with crude MDI (up to 20% or more), in combination with filled polyols, permit reliable foaming. Systems based on TDI with crude MDI, usually in the ratio of 70:30 to 40:60 and in combination with unfilled polyols, are also generally in use at the present time.

In addition, formulations based solely on MDI without admixture of TDI and using unfilled polyols are also found. For these, the ratio of the 2,4'- to 4,4'- isomers as well as the ratio of monomer to polymer can be varied within a wide range.

As amine activators, preferably tertiary amines are used, such as triethylenediamine (TEDA), or the bis-2-dimethylaminoethyl ether (BDE). Many formulations are based on a combined catalysis of these two compounds. However, other common amines are also possible; the amount used usually is between 0.05 and 0.2 parts per 100 parts of polyol.

Multifunctional compounds, which react with isocyanates, are referred to as cross-linking agents. Hydroxyl terminated or amine terminated substances, such as glycerin, triethanolamine (TEOA), diethanolamine (DEOA) and trimethylolpropane are suitable. They are used in concentrations of 0.5 to 2.0 parts per 100 parts of polyol, depending on the formulation; however, they may also be used in other concentrations. When crude MDI is used for foaming in molds, it also assumes a cross-linking function. As the amount of crude MDI is increased, the content of low molecular weight cross linking agent can be decreased correspondingly.

The polyurethane reaction generally is catalyzed by the addition of tin activators. Either dibutyl tin dilaurate (DBTL) or also tin(II) octoate is used, usually in amounts of between 0.01 and 0.3 parts per 100 parts of polyol; these concentrations, may, however, also be different.

Blowing agents are divided into chemical and physical blowing agents. Chemical blowing agents include water, the reaction of which with the isocyanate groups leads to the formation of carbon dioxide. The apparent density of the foam is controlled by the amount of water added, amounts between 1.5 and 4.0 parts per 100 parts of polyol being preferably used. Moreover, additional physical blowing agents, such as fluorochlorohydrocarbons, methylene chloride, acetone, 1,1,1-trichloroethane, etc., can also be used in addition.

Furthermore, for the production of high resilience foam, stabilizers are required for controlling cell size and cell size distribution and for regulating the subsurface area. In comparison to conventional flexible foam stabilizers, they generally have only weakly stabilizing properties. The requirements to be met by stabilizers differ, depending on whether they are to be used for slabstock or molded foam production.

For the slabstock process, aside from the stabilization of the foam, the necessary cell opening at the correct time is the actual problem. If the polymerization reaction has proceeded so far at the end of the expansion that the block is already fully stabilized chemically, opening can usually no longer be carried out. The whole block will therefore shrink. If the cell opening takes place prematurely, then this leads either to a collapse of the foam or, if the system is relatively stable inherently, to a foam, which can a shrink a few hours after it is produced. With the help of a suitable stabilizer, the time, as well as the intensity of the cell opening can be controlled. Moreover, the stabilizer should control the cell structure and, in particular, the subsurface area (particularly important for molded foam). The high resilience foam should have a slightly coarser cell and an irregular cell structure so that the special physical properties can be attained.

The requirements to be met by a stabilizer for high resilience slabstock foam therefore primarily are controlled foam stabilization, cell opening at the appropriate time, cell regulation and control of the cell size distribution.

There are additional requirements for producing high resilience molded foam. The expanding reaction mixture must negotiate relatively wide flow paths, in order to fill the whole volume of the mold. Frictional resistance at the mold walls easily leads to destruction of whole cell structures, so that cavities are formed under the foam skin. This defect also occurs when foam must flow around parts, which have been inserted for reinforcement. A further critical zone is the region of the vent holes. Excess blowing gas, flowing at too high a rate past the cell structures, causes partially collapsed zones.

Moreover, the quality of the foam skin is evaluated critically.

To summarize, a stabilizer for high resilience molded foam must meet the following requirements: sufficient stabilization of the foam, stabilization against the effects of shear forces, stabilization of the subsurface area and of the skin, control of the cell size and the cell size distribution, avoidance of an increased proportion of closed cells.

The general requirements, which are to be met, in addition, by a stabilizer, are a high effectiveness, that is, the stabilizer should develop its optimum effectiveness readily at low concentrations. Furthermore, the processing latitude should be large, that is, the concentration range, in which the stabilizer can be used, should, as far as possible, be large, so that slight changes in the formulation of the foam can be carried out without problems.

Because of the large number of possible raw materials, there are very many different formulations for producing high resilience foams. As a result, the above-mentioned requirements, which a stabilizer must fulfill, are strongly dependent on the system employed. Accordingly, special stabilizers must be developed for the respective system.

In principle, typical high resilience foam stabilizers are polymers based on polysiloxanes, which are modified more or less by suitable organic groups. The chain length of polysiloxanes, suitable for high resilience foam, generally are shorter than the chain length of stabilizers used for conventional flexible foams.

Several possibilities and components are thus available for adapting the structure of the stabilizer to the respective requirements.

According to the present state of the art, essentially two groups of high resilience foam stabilizers are used:

Unmodified siloxanes are employed particularly in inherently stable systems. In this connection, particularly the German patent 25 33 074 and the German Offenlegungsschrift 22 21 should be mentioned.

On the other hand, in formulations, in which real physical stabilization is required in addition (such as formulations based on filled polyols), organo-modified siloxanes are the more important. Suitable polysiloxane-polyoxyalkylene copolymers are disclosed, for example, in the U.S. Pat. Nos. 3,741,917 and 4,031,044. Other suitable organo-modified siloxanes are given in the following Table:

| Modifying Group | Reference |
|---|---|
| cyanoalkyl | U.S. Pat. No. 3 952 038 |
| cyanoalkoxyalkyl | German Auslegeschrift 24 02 690 |
| sulfolanyloxyalkyl | U.S. Pat. No. 4 110 272 |
| morpholinoalkoxyalkyl | U.S. Pat. No. 4 067 828 |
| t-hydroxyalkyl | U.S. Pat. No. 4 039 490 |
| chloropropyl | German Patent 36 26 297 |
| chloromethyl | German Offenlegungsschrift 27 36 138 |
| linear alkyl | European Patent 0 037 067 |
| branched alkyl | European Patent 0 243 131 |
| aralkyl | German Patent 23 56 443 |

In spite of this large number of stabilizers, it is not possible to fulfill all the requirements of the application. Up to now, no stabilizers are known, which can be used universally in all high resilience foam systems. Moreover, the problem of finding a balance between the formation of a stable and, at the same time, a very open-celled foam, represents a special challenge. In addition, new, previously unknown problems arise constantly, the solution of which cannot be accomplished or can be accomplished only incompletely with the known stabilizers of the state of the art.

The present invention therefore is concerned with the task of finding new stabilizers, which are suitable for the production of high resilience polyurethane foams and are in a position to better solve the already known problems or to solve new problems for the first time.

One problem of the high resilience foams used in the automobile sector consists therein that they contribute to undesirable fogging. The formation of a light-scattering deposit on the inner glass surfaces of an automobile is referred to as fogging. The primary source of this deposit are volatile components of the polymeric materials, which are used for outfitting the interior of the vehicle and, because of the temperature condition, evolve gases in the vehicle, which then condense on the relatively cooler glass surfaces. The automobile industry therefore is interested in reducing such fogging deposits as far as possible.

The volatile components in the high resilience foam are the cause of the fogging deposits, insofar as the latter are caused by the high resilience foam. A not inconsiderable portion of the volatile components originates from the stabilizer. These volatile components are contained in every stabilizer mixture as a result of the manufacturing conditions.

It is therefore an object of the present invention to develop new stabilizers, in which these volatile components' portions are reduced or eliminated completely.

Moreover, the present invention is concerned quite generally with the problem of developing stabilizers with improved properties. These properties include, in particular:

An improved open-celled nature of the foam and, with that, better crushing behavior with, at the same time, adequate stabilization, higher effectiveness, wider processing latitude, better skin quality of the molded foams, products, which can be used universally, that is, for high resilience slabstock foam systems as well as for high resilience molded foam systems.

OBJECT OF THE INVENTION

An object of the present invention is a method for producing high resilience polyurethane foams. It is achieved by reacting a mixture of highly reactive polyols having a weight average molecular weight between about 4,800 and 6,500 g/mole and containing at least 70% primary hydroxyl groups and optionally fillers, polyfunctional isocyanates, amine activators, cross-linking agents, tin catalysts, blowing agents and stabilizers. The method is characterized in that compounds of the general formula

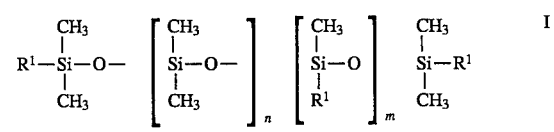

in which $R^1$ is same or different in an average molecule and represents a methyl group or a group having the general formula $-CH_2-CH_2-(CH_2)_a-O-R^2$ (a=0 or 1; $R^2$=phenyl), with the proviso that at least one $R^1$ group is a group having the formula $-CH_2-CH_2-(CH_2)_a-O-R^2$, n has an average numerical value of 2 to 11, m has an average numerical value of 1 to 6, with the proviso that the ratio of p=(n+m+2)/m is 1 to 12, are added as stabilizers.

SUMMARY OF THE INVENTION

Compared to stabilizers of the state of the art, the stabilizers, which are to be used for the inventive method, are employed at a lower concentration. A clear decrease in the fogging behavior of the stabilizers is associated with this. The degree of open cells, which is measured by the force to crush is increased in the case of the foams produced pursuant to the invention, so that consequently the tendency to shrinkage of the foams obtained is clearly reduced. In particular, it is seen that the polysiloxanes, which are to be used for the inventive method, have a much improved balance between stabilizing properties and cell-opening properties. In addition, skin disorders are avoided and, at the same time, good regulation of the subsurface area is observed.

Moreover, stabilizers, suitable for producing any type of high resilience foam system, can be produced pursuant to the invention merely by changing the variables a, n and m mentioned above. This is not possible with the stabilizers of the state of the art. Until now, a stabilizer or combination of stabilizers of different classes of compounds, adapted to each high resilience foam system, had to be used in order to obtain a defect-free foam.

The inventive stabilizers therefore are a novel class of universal stabilizers, which can be used for high resilience slabstock foaming as well as for high resilience molded foaming, for systems based on pure TDI, TDI/MDI mixtures and pure MDI in combination with the corresponding polyols.

Particularly preferred is an inventive method, in which compounds are used as stabilizers, which are free of polysiloxanes having a chain length $\leq 5$ and $\leq 16$. In accordance with the state of the art, the polysiloxanes are fractionated advisably before the $R^1$ group(s) is (are) introduced.

If polysiloxanes of formula I, which are fractionated in this manner and the composition of which thus deviates from that of a random distribution of polysiloxanes of different chain lengths, as obtained normally by equilibration, are used in high resilience foam systems, the fractionated siloxanes show the following special advantages over equilibrated siloxanes:

The stabilizers have a wider processing latitude. Good stabilization and an improved good open-celled character of the foams are achieved, the foam having a very good skin quality, particularly in molded foam systems. At the same time, cell regulation is improved.

By removing the long-chain siloxanes, the tendencies to shrink and to defoam decrease considerably.

By removing the short-chain siloxanes, a better fogging behavior of the foams is achieved.

The superior properties of the inventive organofunctionally modified polysiloxanes of formula I are confirmed by the following Examples, it being understood that the following Examples are provided by way of illustration and not by way of limitation. The amounts given are in parts by weight.

I. Use of Equilibrated, Organofunctionally Modified Polysiloxanes

EXAMPLE 1

As a stabilizer, a siloxane of formula I with the subscript $a=1$, subscript $n=5$, subscript $m=1$ and subscript $p=8$ is used.

The stabilizer is tested by means of a typical high resilience slabstock foam formulation based on filled polyols and pure TDI. The siloxane is used in different concentrations. The results are compared with those obtained using a stabilizer of the state of the art preferred for this type of foam. The polysiloxane has chloropropyl groups of the German patent 36 26 297 as modifying groups.

| Raw Material | Parts by Weight |
| --- | --- |
| polymer polyol | 100.00 |
| water | 3.50 |
| diethanolamine | 1.00 |
| bis-2-dimethylaminoethyl ether | 0.05 |
| triethanolamine | 0.15 |
| dibutyl tin dilaurate | 0.15 |
| TDI | 41.00 |
| stabilizer | 0.2–1.5 |
| Index <100> | |

The index 100 means that the amount of isocyanate groups used is equal to the stoichiometrically calculated amount of isocyanate groups, which is required for the reaction with the water and the hydroxyl groups of the polyols.

With the comparison product of the state of the art, a minimum concentration of 0.6 parts is required in order to obtain a foam, in which the cell size and the subsurface areas are controlled well and which is open celled and shows no shrinkage. However, there is strong lifting (cold collapse) in the bottom zone, which indicates incomplete cell opening.

At a concentration of only 0.2 parts of the inventive siloxane, foams are obtained, which have the following advantages over the standard foam:

There is better cell opening, so that there is hardly any lifting off in the bottom zone. A coarser cell structure is attained, which is of advantage for the physical properties.

In this formulation, the use of an unmodified polydimethylsiloxane of the German patent 25 33 074 leads to a collapse of the foam.

EXAMPLE 2

A siloxane of formula I, with the subscript $a=1$, subscript $n=4$, subscript $m=2$ and subscript $p=4$ is used.

The testing is carried out with a typical high resilience molded foam formulation based on filled polyols and pure TDI. The siloxane is used at different concentrations. The results are compared with those of a stabilizer of the state of the art, which is preferred for this type of foam. The stabilizer is a polysiloxane which, pursuant to the European patent 0 106 101, has polyether groups as modifying groups.

| Raw Material | Parts By Weight |
| --- | --- |
| PHD polyol | 100.00 |
| water | 4.00 |
| diethanolamine | 1.50 |
| triethylenediamine | 0.50 |
| bis-2-dimethylaminoethyl ether | 0.07 |
| TDI | 47.90 |
| stabilizer | 0.1–1.5 |
| Index <100> | |

Both products are used at different concentrations. With the stabilizer of the state of the art, it was not possible to produce a defect-free foam in any of the experiments. Either the subsurface areas have defects (when the stabilizer is used at a low concentration) or shrinkage of the foam occurs (when the stabilizer is used in higher concentrations). The condition of the skin is also defective. It was possible to eliminate these defects only through the additional use of unmodified polydimethylsiloxanes, which is disadvantageous because two components have to be employed, which is less desirable for the handling under practical conditions and because an unfavorable fogging behavior results due to the fact that it is necessary to employ unmodified polydimethylsiloxanes, which tend to be volatile (see Example 3).

The inventive product is superior according to all evaluating criteria:

When used at a concentration of only 0.1 part, a very open-celled foam is obtained. The force-to-crush values (indentation load deflection (ILD) in [N], measured directly after removal of the foam from the mold at 50% compression) are lower when the inventive stabilizer is used than those of the stabilizer of the state of the art is used, and even when the latter is used in combination with an unmodified siloxane. In addition, it may be noted that the subsurface areas are regulated very well. The skin of the foam obtained shows no disorders whatsoever. Because of the open-cell character, there is no tendency to shrink.

The following Table illustrates the results:

| Product | Minimum Concentration Used Parts | Edge Zone | Skin | Shrinkage | First Force to Crush Value [N] |
|---|---|---|---|---|---|
| of invention | 0.1 | io | io | io | 370 |
| comparison | 0.6 | io | sl | 1 | 970 |
| Comparison + unmod. PDMS (3:2) | 0.4 | io | io | io | 476 |

Key for above Table:
io: in order
sl: very slightly disturbed
l: slightly disturbed Unmodified polydimethylsiloxane cannot be used by itself in accordance with the German patent 25 33 074 in this formulation, since it leads to strong defoaming within the foam cushion.

II. Use of Fractionated, Organofunctionally Modified Polysiloxanes

EXAMPLE 3

As stabilizer, a siloxane of formula I, with subscript $a=1$, subscript $n=5$, subscript $m=1$ and subscript $p=8$, is used. The stabilizer is free of polysiloxanes having a chain length $\leq 5$ and $\leq 16$.

The stabilizer was tested by means of a typical high resilience molded foam formulation. The latter is based on a conventional (unfilled) polyol and a TDI/crude MDI mixture as isocyanate component. According to the state of the art, only unmodified polydimethylsiloxanes could be used as stabilizers in such formulations.

| Raw Material | Parts by Weight |
|---|---|
| conv. polyol | 100.00 |
| water | 3.00 |
| triethylenediamine | 0.60 |
| dimethylethanolamine | 0.20 |
| triethanolamine | 2.00 |
| 40% crude MDI/60% TDI | 46.20 |
| stabilizer | 0.1–1.0 |
| Index <100> | |

When unmodified siloxanes are used as stabilizers in accordance with the German patent 25 33 074 at a minimum concentration of 0.6 parts, a defect-free foam is obtained. When the concentration used is doubled, there is strong shrinkage of the foam. The inventive method, carried out with the fractionated, modified organopolysiloxane, permits stabilizers to be used in a wider range of concentrations from 0.1 to 1.2 parts. Basically, an open, very well regulated, nonshrinking foam is obtained, even when the stabilizer is used in high concentrations. A special advantage of these fractionated products, used for the inventive method, thus lies in their broad processing latitude, as shown by the force to crush values listed in the following:

| Product | Concentration Parts | First Force To Crush Value [N] |
|---|---|---|
| of invention | 0.1 | 653 |
|  | 0.6 | 723 |
|  | 1.2 | 815 |
| Comparison | 0.1 | no subsurface area regulation |
|  | 0.6 | 879 |
|  | 1.2 | strong shrinkage |

Moreover, the inventive foams exhibit the required decrease in the fogging behavior. This is shown by the fogging values determined according to DIN 75201B (at concentrations of 0.6 parts in both cases):

fogging value—comparison 2.7 mg fogging value—of the invention 1.2 mg

According to the state of the art, it was previously not possible to incorporate organomodified siloxanes successfully in these molded foam systems, because such a procedure, as a result of the over-stabilization, resulted in strong shrinkage of the foams.

EXAMPLE 4

As stabilizer, a siloxane of formula I with subscript $a=1$, subscript $n=6$, subscript $m=1$ and subscript $p=9$ is used. The stabilizer is free of polysiloxanes having a chain length $\leq 5$ and $\leq 16$.

The test was carried out with a filled polyol/TDI molded foam formulation. A stabilizer of the state of the art, modified in accordance with the German patent 36 26 297 with chloroalkyl groups, is used for comparison. Furthermore, a stabilizer, with the subscripts given above but based on equilibrated, organofunctionally modified siloxanes, is used for comparison.

| Raw Material | Parts by Weight |
|---|---|
| PHD polyol | 100.00 |
| water | 4.00 |
| diethanolamine | 1.50 |
| triethylenediamine | 0.50 |
| bis-2-dimethylaminoethyl ether | 0.07 |
| TDI | 47.90 |
| stabilizer | 0.1–1.5 |
| Index <100> | |

The following results are obtained:

| Product | Concentration Parts | Sub-surface Area | Skin | Shrinkage | First Force to Crush Value [N] |
|---|---|---|---|---|---|
| Inventive Fraction | 0.1 | io | io | io | 331 |
|  | 0.6 | io | io | io | 470 |
|  | 1.0 | io | io | io | 537 |
| Inventive Equilibr. | 0.1 | io | io | io | 651 |
|  | 0.6 | io | io | sl | 970 |
|  | 1.0 | io | io | 1 | 1270 |
| Comparison | 0.1 | io | io | sl | 687 |
|  | 0.6 | io | 1 | 1 | 1045 |
|  | 1.0 | very | | | |

-continued

| Product | Concentration Parts | Sub-surface Area | Skin | Shrink-age | First Force to Crush Value [N] |
|---------|---------------------|------------------|------|------------|-------------------------------|
|         |                     |                  |      | strong shrink-age |                      |

Key for above Table:
io: in order
sl: very slightly disturbed
l: slightly disturbed It is seen that a defect-free, well regulated foam is obtained over a wide range of concentrations with the stabilizer, which is used for the inventive method and is based on fractionated siloxanes. The outstanding advantages over the comparison product of the state of the art are a broader processing latitude with good effectiveness, an outstanding open-celled character even at high concentrations, no tendency to shrinkage and a particularly good skin quality.

In comparison to the stabilizer based on equilibrated siloxanes, the particular advantage of a broad processing latitude is seen. Especially the tendency to shrinkage is far less due to the removal of the long-chain siloxanes.

In general, it is seen that the stabilizers, which are to be used for the inventive method, represent a new class of compounds with superior properties. In contrast to stabilizers of the state of the art, the inventive stabilizers can be used universally in high resilience slabstock foam systems as well as in high resilience molded foam systems, in formulations based on pure TDI, TDI/MDI mixtures and also on pure MDI in conjunction with the appropriate polyols.

Previously, the use of stabilizers of different classes of compounds or of combinations of stabilizers of different type, adapted in every case to the high resilience foam system, was unavoidable.

Moreover, the special property of the inventive stabilizers consists in the outstanding balance between adequate stabilization and, at the same time, a high degree of opened cell of the high resilience foams. They have a broad processing latitude and lead to foams with a particularly good skin quality.

We claim:

1. A method for producing high resilience polyurethane foams by reacting a mixture of highly reactive polyols having a weight average molecular weight between about 4800 and 6500 g/mole and containing at least 70% primary hydroxyl groups and optionally fillers, polyfunctional isocyanates, amine activators, cross-linking agents, tin catalysts, blowing agents and stabilizers, comprising adding as a stabilizer a compound of the general formula

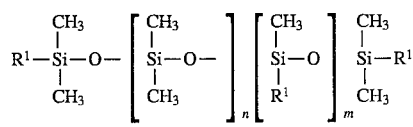

in which $R^1$ is a same or different in an average molecule and represents a methyl group or a group having the general formula $-CH_2-CH_2-(CH_2)_a-O-R^2$ (a=0 or 1; $R^2$=phenyl), with the proviso that at least one $R^1$ group is a group having the formula $-CH_2-CH_2-(CH_2)_a-O-R^2$, n has an average numerical value of 2 to 11, m has an average numerical value of 1 to 6, with the proviso that the ratio of p=(n+m+2)/m is 1 to 12.

2. The method of claim 1, wherein the stabilizers are compounds, free of polysiloxanes having a chain length of $\leq 5$ and $\geq 16$.

3. A high resilience polyurethane foam obtained by the method of claims 1 or 2.

* * * * *